UNITED STATES PATENT OFFICE 2,198,967

CONDENSATION PRODUCTS OF PYRENE

Heinrich Hopff, Helmut Eichel, and Hans Schoenherr, Ludwigshafen-on-the-Rhine, Germany, assignors to General Aniline & Film Corporation, a corporation of Delaware No Drawing. Application November 18, 1937, Serial No. 175,276. In Germany November 25, 1936

6 Claims. (Cl. 260—668)

The present invention relates to new condensation products of pyrene.

We have found that new valuable condensation products of pyrene are obtained by causing pyrene or its halogen derivatives to react in the presence of catalysts of the Friedel-Crafts type with halogen compounds containing at least two aliphatically bound halogen atoms.

Halogen compounds of the said kind are for example methylene chloride, ethylene chloride, propylene chloride, butylene chloride, ethylidene chloride, chloroform, benzal chloride and acetylene tetrachloride.

The reaction is preferably carried out by dissolving the pyrene or a halogen pyrene in the halogen compound and, after the introduction of the catalyst, as for example anhydrous aluminium chloride, heating the mixture until the disengagement of hydrogen chloride ceases. When halogen compounds of low boiling point are used, the reaction is preferably carried out in the presence of solvents of higher boiling point which do not take part in the reaction, such as monochlorbenzene, ortho-dichlorbenzene, or trichlorbenzene and/or in a closed vessel. The reaction mixture is worked up in the usual manner. For example it may be introduced into water, the volatile constituents removed by means of steam and the final product separated by boiling under strongly reduced pressure, by sublimation or by recrystallization.

In the new pyrene derivatives, several pyrene radicals are joined to each other by alkylene or aralkylene groups. They are soluble in organic solvents giving a powerful yellow-green to moss-green fluorescence and may serve for example for characterization of hydrocarbons, as for example of fuels or lubricating oils.

The following examples will further illustrate how the said invention may be carried out in practice but the invention is not restricted to these examples. The parts are by weight.

Example 1

A mixture of 100 parts of pyrene, 300 parts of anhydrous aluminium chloride, 50 parts of methylene chloride and 1000 parts of chlorbenzene is heated under reflux while stirring well so that it boils gently until hydrogen chloride no longer escapes. After cooling, the mixture is added to ice, the solvent and unused methylene chloride removed by means of steam and the residue filtered off by suction, washed with water, dried and freed from any impurities by treatment with warm alcohol. The brown residue is soluble in hydrocarbons and hydrocarbon mixtures giving a yellow coloration and a powerful green fluorescence.

Example 2

A mixture of 100 parts of pyrene, 300 parts of anhydrous aluminium chloride, 50 parts of ethylidene chloride and 1000 parts of chlorbenzene is heated to boiling under reflux while stirring well until the evolution of hydrogen chloride has ceased. The mixture is then decomposed with ice, the solvent mixture removed by means of steam and the residue filtered off by suction, washed with water, boiled with alcohol and recrystallised from benzene. A brown powder is thus obtained which dissolves in hydrocarbons giving a pale yellow coloration and a green fluorescence.

Example 3

A mixture of 100 parts of pyrene, 50 parts of ethylene dichloride, 300 parts of anhydrous aluminium chloride and 1000 parts of chlorbenzene is heated to boiling until the cessation of the evolution of hydrogen chloride. After working up, a red-brown final product is obtained which is soluble in benzene to give a yellow coloration and a green fluorescence.

Instead of ethylene dichloride, there may be used with advantage an equal amount of propylene chloride or butylene chloride. The substances thus obtainable are distinguished by especially good solubility.

Example 4

A mixture of 100 parts of pyrene, 50 parts of chloroform, 300 parts of anhydrous aluminium chloride and 1000 parts of chlorbenzene is heated until the evolution of hydrogen chloride ceases. After working up, a brown substance is obtained which imparts to benzene a yellow coloration and a yellow-green fluorescence.

The same amount of acetylene tetrachloride may be used with advantage instead of the chloroform. The final product thus obtainable has similar properties.

Example 5

A mixture of 100 parts of pyrene, 50 parts of benzal chloride, 300 parts of anhydrous aluminium chloride and 1000 parts of chlorbenzene is heated to boiling until hydrogen chloride no longer escapes. After working up, a substance is obtained which dissolves in benzene with a green fluorescence.

What we claim is:

1. A composition of matter comprising a condensation product consisting of at least two pyrene radicals joined to each other by an alkylene group.

2. A composition of matter comprising a condensation product consisting of at least two pyrene radicals joined to each other by a methylene group.

3. A composition of matter comprising a condensation product consisting of at least two pyrene radicals joined to each other by an ethylene group.

4. A composition of matter comprising a condensation product consisting of at least two pyrene radicals joined to each other by an alkylene group, and a liquid hydrocarbon.

5. A composition of matter comprising a condensation product consisting of at least two pyrene radicals joined to each other by a methylene group, and a liquid hydrocarbon.

6. A composition of matter comprising a condensation product consisting of at least two pyrene radicals joined to each other by an ethylene group, and a liquid hydrocarbon.

HEINRICH HOPFF.
HELMUT EICHEL.
HANS SCHOENHERR.